United States Patent [19]
Flanigan et al.

[11] Patent Number: 5,809,758
[45] Date of Patent: Sep. 22, 1998

[54] RIDING MOWER APPARATUS

[76] Inventors: Virgil J. Flanigan, 11320 County Rd. 2140; Charles V. Otis, 12185 County Rd. 2030, both of Rolla, Mo. 65401

[21] Appl. No.: 714,191

[22] Filed: Sep. 16, 1996

[51] Int. Cl.[6] ............................. A01D 34/82; A01D 43/00
[52] U.S. Cl. ............................................. 56/13.7; 56/14.7
[58] Field of Search ..................... 56/13.7, 12.1, 56/12.7, 13.5, 13.6, 13.8, 16.9, 14.7

[56] References Cited

U.S. PATENT DOCUMENTS

| | | | |
|---|---|---|---|
| 4,242,855 | 1/1981 | Beaver, Jr. | 56/13.7 |
| 4,306,402 | 12/1981 | Whimp | 56/10.6 X |
| 4,333,302 | 6/1982 | Thomas et al. | 56/11.9 X |
| 4,559,768 | 12/1985 | Dunn | 56/16.9 |
| 4,870,811 | 10/1989 | Steele | 56/16.9 X |
| 5,195,308 | 3/1993 | Grote et al. | 56/16.9 X |

*Primary Examiner*—Terry Lee Melius
*Attorney, Agent, or Firm*—Polster, Lieder, Woodruff & Lucchesi, L.C.

[57] ABSTRACT

Riding mower apparatus which combines a rider controlled motor drive for area mowing, a battery power source carried by the riding mower, and a trimmer carried by the riding mower to be powered by the battery power source and located to be detachable from the riding mower and maneuverable by the rider to trim around stationary objects in the area.

1 Claim, 1 Drawing Sheet

RIDING MOWER APPARATUS

BACKGROUND OF THE INVENTION

This invention is directed to riding mower apparatus which includes a battery powered trimmer carried by the mower for ready use of the riding mower battery source for operating trimming apparatus around objects not normally approachable by a riding mower itself.

The known examples of prior art reside in hand held trimmer devices having a long power cable attachable to electrical 110 volt outlets. Additionally trimmer devices are known that are adapted to be carried by an individual in which the trimmer power is in an attached gasoline motor or a rechargeable battery back pack to enable mobility of the individual for trimming around trees, hedges and similar objects not normally permitting power mowers approach. Trimmer devices which represent the prior art are quite handy where the areas to be trimmed are small and usually located near houses having areas needing trimming.

The present invention is most useful to trim around stationary objects scattered in large areas which are associated with lawns that are quite large requiring the expenditure of time to complete both mowing and trimming as separate or conjoint operations.

The object of the invention is to combine apparatus in which the usual mowing and trimming work is carried out at the same time by a combination of the usual equipment having a common power source.

A further object is to adapt apparatus in the form of a trimmer to make use of the power source in a riding mower so that mowing and trimming can be usefully performed at the same time.

Other objects will be set forth in the following specification.

BRIEF DESCRIPTION OF THE DRAWINGS

The apparatus in its preferred form is illustrated in the drawings in which.

DETAILED DESCRIPTION

Figure 1:
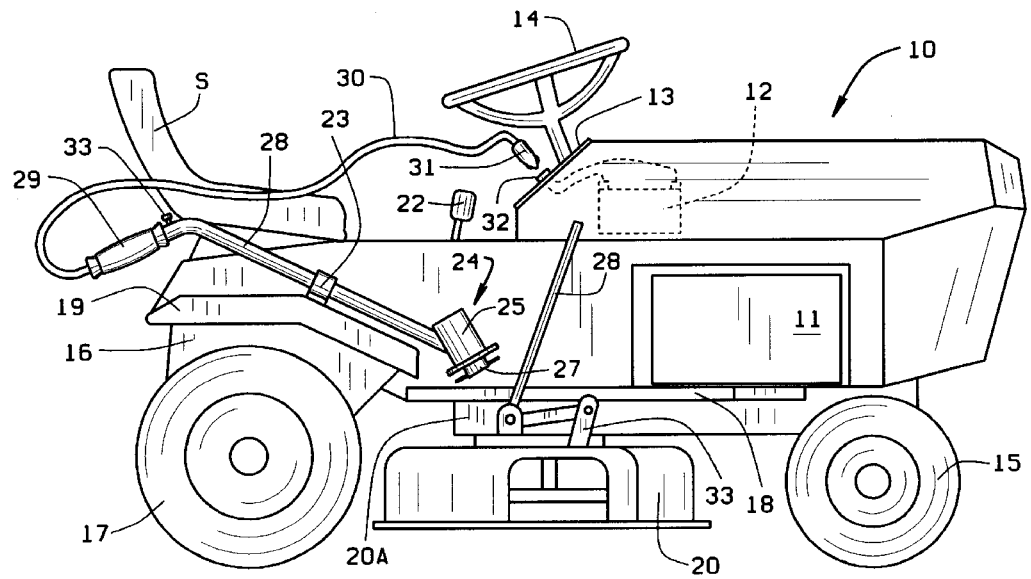
FIG. 1 is a side elevational view of a typical riding mower having a control panel and trimmer unit thereon.

The side elevational view of the apparatus shows a typical riding mower 10 equipped with a space 11 enclosing an internal combustion motor (not necessary to show in detail) having a starting battery 12 in the usual ignition system controlled by an ignition key access in the control panel 13. The mower 10 has seat 5 for the operator, and a steering wheel 14 to control the steerable front wheels 15. The motor is adapted to operate a usual transmission 16 for powering the rear wheels 17. The operator seat 5 is situated so the feet of an operator A (FIG. 2) is able to rest the feet on a running board 18, while operator protection is provided by locating rear wheel fenders 19.

A grass cutting mower assembly 20 is suspended under the mower 10, and an operation control lowering and raising lever 28 for the assembly 20 is located at one side of the control panel 13 where it is easily accessible to the operator A. A speed control 22 is provided to regulate the movement of the mower 10, and the usual belt drive for the mower 20 is enclosed in a suitable frame 20A.

The view of FIG. 1 shows the normal mounting clip 23 for storing a trimmer unit 24. That unit has a motor drive 25 for the rotary head 27, and a maneuvering rod 28 with a grip 29. The grip 29 houses the connection for a power cord 30 which can be removably connected by contact at 31 into the receptacle 32 at panel 13. A suitable switch 33 is located adjacent the grip 29 for manually supplying battery power to the trimmer 24 at its drive motor 25.

The internal combustion engine for the riding mower is accessible through the opening at space 11. While the trimmer power head 25 is positioned at the fender 19, the mower assembly 20 is equipped with a control lever 28 which is operative through a suitable linkage 33 associated with raising or lowering the operation of the assembly 20.

Figure 2:
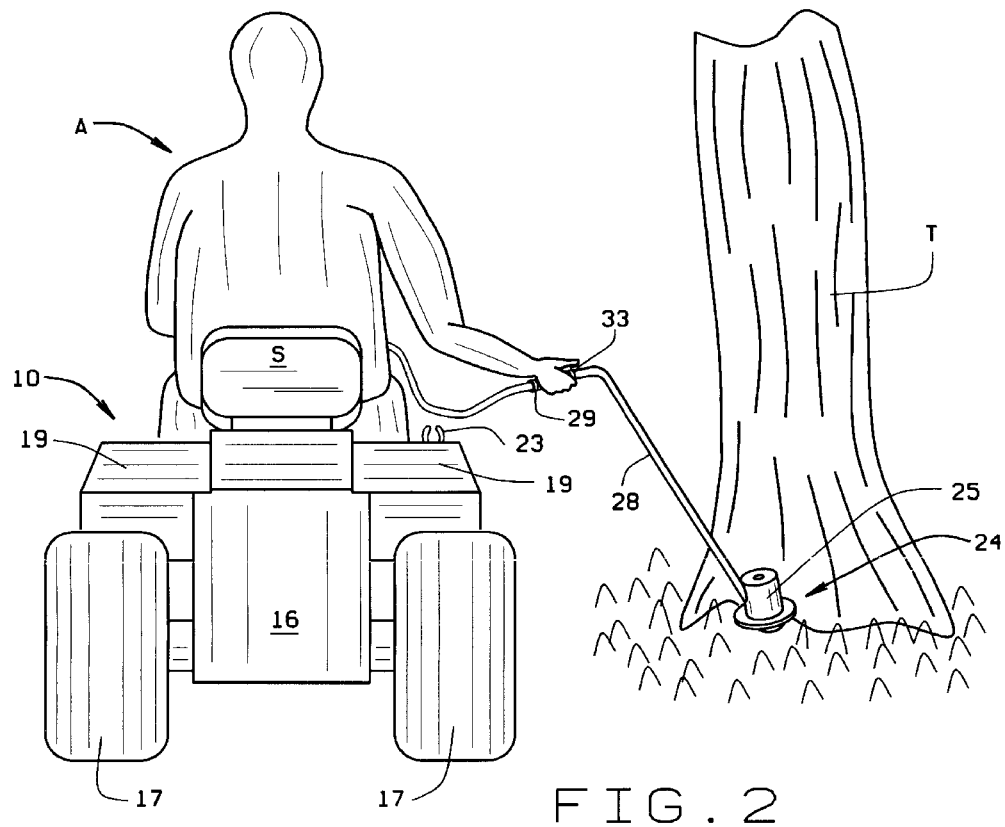
FIG. 2 is a view from the rear of a riding mower to illustrate the simultaneous use of a trimmer unit operated from the operational riding mower.

The view of FIG. 2 shows the riding operator A on the mower 10 applying the trimmer head 25 around the base of a tree T. The trimmer unit 24 is positioned so the switch 32 can be operated while the riding mower 10 is operative. The power cord 30 is long enough to permit release of the trimmer 24 from the fender clip 23 for reaching the area at the base of tree T to reduce the size of the planting in that area. While a trimmer unit 24 is disclosed, other battery operated apparatus may also be provided for practicing lawn care for cutting or trimming growth plants and the like. In the view of FIG. 2 the riding mower 10 can be steered to circle the base of the tree T before continuing into open areas. When the mowing is completed so may be the trimming or other types of apparatus.

What is claimed is:

1. Riding apparatus for combining the separate function of area mowing and trimming, the apparatus comprising:

a) a riding mower having a motor drive for propelling said mower;

b) a motor starting battery source of electrical current carried by said riding mower and including a current outlet receptacle;

c) a trimmer device releasably carried by said riding mower; and d) rider manually maneuvered control means having a current cord connected to said trimmer device, said maneuvered control means being connected through said cord into said receptacle into said motor start battery for electrical current and a manual operated on-off switch to control said trimmer device separate from said riding mower.

* * * * *